T. Y. VAN CLEAVE.
Wagon.
No. 161,302.
3 Sheets--Sheet 1.
Patented March 23, 1875.
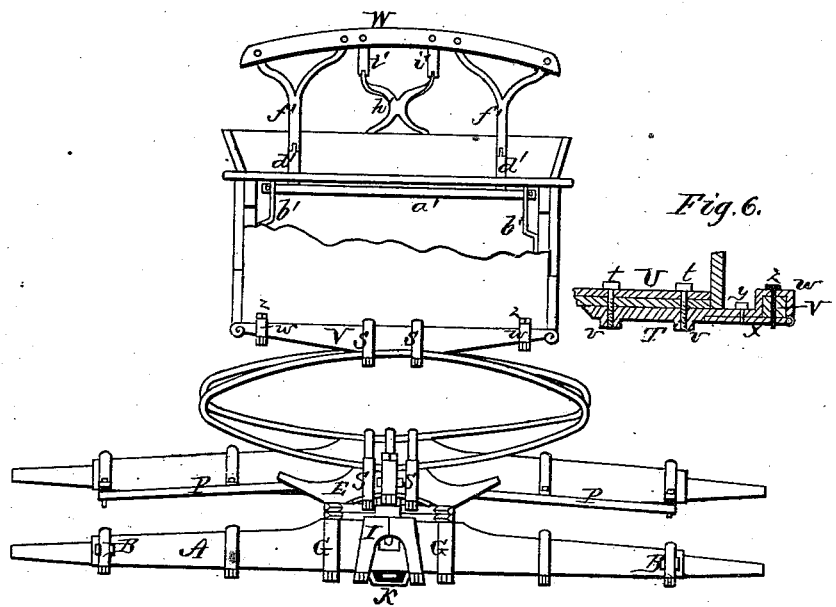
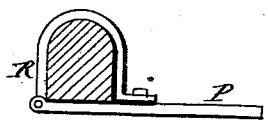
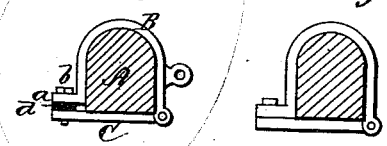
WITNESSES
INVENTOR T. Y. VAN CLEAVE.
Wagon.

No. 161,302.

3 Sheets--Sheet 2.

Patented March 23, 1875.

WITNESSES
Henry N. Miller
C. L. Evert

INVENTOR
Thos. Y. Van Cleave.
per
Alexander Mason
Attorneys

3 Sheets--Sheet 3.
T. Y. VAN CLEAVE.
Wagon.
No. 161,302. Patented March 23, 1875.
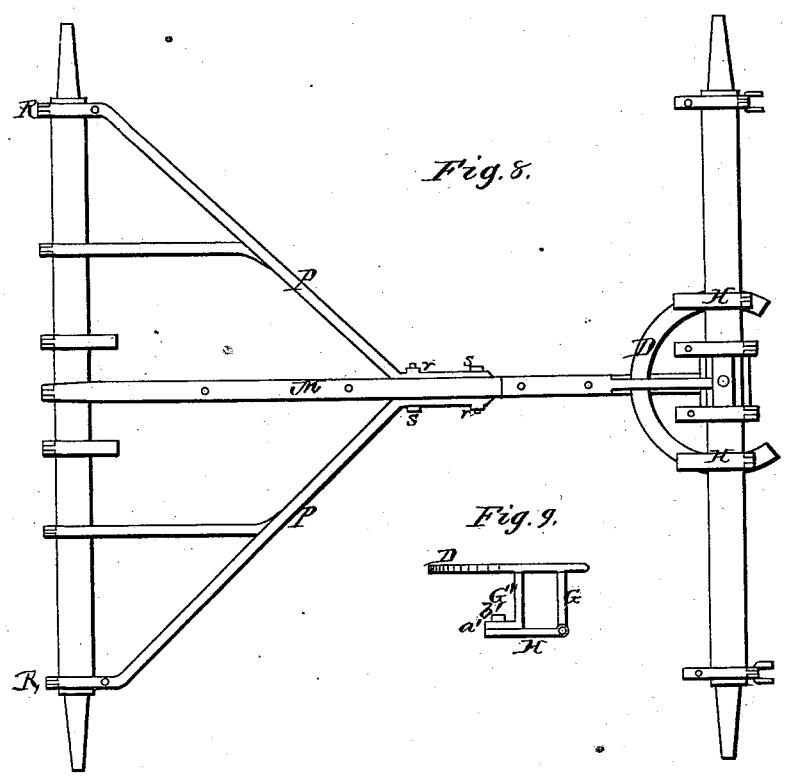
WITNESSES
Henry N. Miller
C. L. Eurih
INVENTOR
Thos Y. Van Cleave
per
Alexander T. Mason
Attorneys

UNITED STATES PATENT OFFICE.

THOMAS Y. VAN CLEAVE, OF CORNERSVILLE, TENNESSEE.

IMPROVEMENT IN WAGONS.

Specification forming part of Letters Patent No. 161,302, dated March 23, 1875; application filed November 21, 1871.

*To all whom it may concern:*

Be it known that I, THOMAS Y. VAN CLEAVE, of Cornersville, in the county of Marshall and in the State of Tennessee, have invented certain new and useful Improvements in Vehicles; and do hereby declare that the following is a full, clear, and exact description thereof, reference being had to the accompanying drawings, and to the letters of reference marked thereon, making a part of this specification.

The nature of my invention consists in a new mode of ironing off vehicles without the use of taps, as will be hereinafter more fully set forth.

In order to enable others skilled in the art to which my invention appertains to make and use the same, I will now proceed to describe its construction and operation, referring to the annexed drawings, in which—

Figure 2:
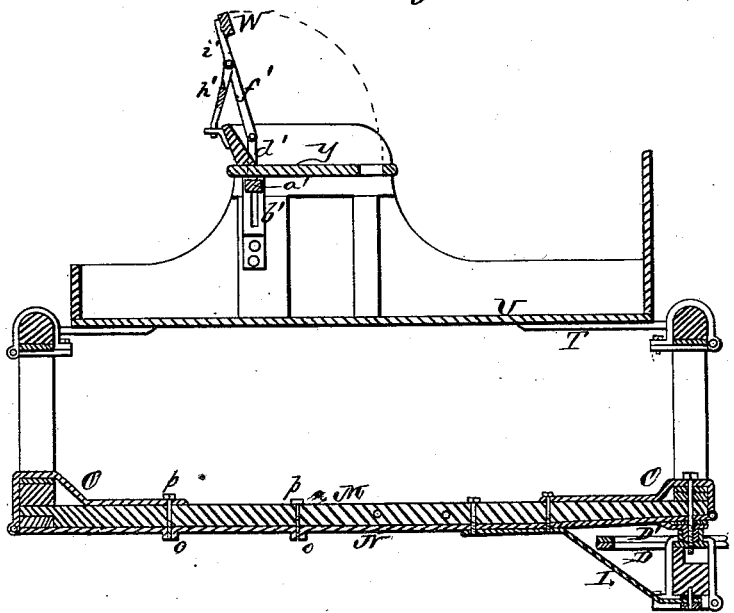

Figure 1 is a front elevation of a vehicle embodying my invention. Fig. 2 is a longitudinal vertical section of the same, and Figs. 3 to 9 are detached views of parts thereof.

Figure 7:
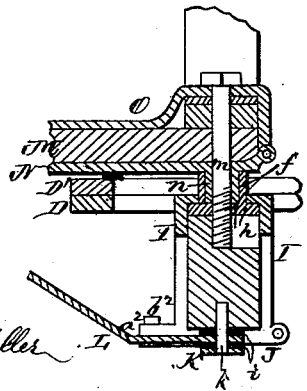

A represents the front axle of a vehicle upon which are the shaft-cuffs B B, each of said cuffs being hinged to the front end of a bar, C, and carried over the axle and set at right angles at $a$ on the side opposite to the hinge, where it is fastened to the rear end of the bar C by a bolt, $b$, as shown in Fig. 3. A piece, $d$, of rubber is placed between the part $a$ of the cuff B and the rear end of the bar C, the bolt $b$ passing through the rubber-piece and screwing into the bar C. D represents the lower, and D' the upper, part of the fifth-wheel. The upper part D' is fastened to the head-block E by means of two bolts, while the lower part D has on each side two perpendicular bars, G G', which extend downward on each side of the front axle A. The lower end of the front bar G is hinged to a cross-bar, H, which extends under the axle, and the lower end $a^1$ of the bar G' is bent outward, and a bolt, $b^1$, passes through said end and screws into the end of the bar H. The fifth-wheel cuff thus constructed is fully shown in Fig. 9. The coupling-cuff I may be made in one or two pieces, the lower front ends being hinged to bottom cross-bars J, and their rear ends bent at $a^2$, as shown in Fig. 7, and fastened by bolts $b^2$ to the said cross-bars. On this cuff I may be formed an oil-cup, $f$, or this oil-cup may be made solid to a plate, $h$, and let into the axle and held firmly to its place by the cuff, there being a hole cut through the top thereof in the center. The two bars, J, are connected by a bar, K, through the center of which passes a pin, $k$, and this pin passes also through a hole in the perch-brace L. Rubber $i$ is placed around the pin $k$ above and below the brace, when the cuff is made fast, thereby preventing any rattling noise made by the brace. M represents the ordinary perch-pole, along the under side of which is the iron N having a small nut, $n$, formed on its under side at the front end. This nut fits into the tumbler or oil-cup $f$, and serves as a coupling-pin. A bolt, $m$, passes through the center cuff and top bar of perch, through the spring head-block E, and through the nut $n$ and screws into a small hole in the bottom of the tumbler or oil-cup $f$. This bolt when screwed up simply serves to holds the parts together, and not as a coupling-pin. It also stops the hole in the bottom of the tumbler, and makes a perfect oil-cup. The iron N along the under side of the perch-pole M has at each end a loop, O, hinged to it, which loops pass over the front and back springs, and then run along the top of the perch-pole a sufficient distance, when they are bolted through into a small nut, $o$, made solid to the under perch-iron N, and thereby preventing any pulling apart of the front and back axles. Between the ends of these top perch-irons are two other bolts, $p$, which are bolted, through the perch-pole, into nuts formed on the under perch-iron, the same as the above. P P are the axle-stays fastened to the axles by hinged cuffs R, the under part of the cuff passing on to its proper place at the perch M, where the one on one side has nuts $r$ made solid to its side with threads cut in them, while bolts $s$ pass through the one on the other side directly opposite into the nuts, thus making the axle-stays perfectly fast. S S are the spring-cuffs, which are hinged, and pass over the spring and axle, or spring and spring-bar, and fasten upon the principle as described in the shaft-cuff. T represents the bed-irons, which are fastened to the bed U by bolts $t$ passing through the side rails of the bed into nuts $v$, which are made solid with the bed-iron. The outer ends of these irons come out a proper distance from the bed, and then form a loop, $w$, which passes over the spring-bar V. A short bar, $x$, is then hinged to the loop, and brought along under the spring-bar to the bed-iron, as shown in Fig. 6, where it is made fast by means of a bolt, $y$, another bolt, $z$, passing immediately through the spring-bar, as shown in Fig. 6.

Having thus fully described my invention, what I claim as new, and desire to secure by Letters Patent, is—

1. The shaft-cuff B, hinged to the bar C, and fastened by means of the bent end $a$, bolt $b$, and rubber $d$, all combined as and for the purposes set forth.

2. A vehicle-cuff made in two pieces, and hinged together and fastened by a bolt passing through the bent end of the top part, and screwed into the end of the bottom part, all combined as set forth.

3. The lower part D of the fifth-wheel, provided with the bars G G', in combination with the hinged bar H and bolt $b^1$, as and for the purposes set forth.

4. The combination of the coupling-cuff I, oil-cup $f$, perch-iron N, with nut $n$, and the fastening-bolt $m$, substantially as and for the purposes set forth.

5. The combination of the coupling-cuff I, hinged bars J J, cross-bar K, perch-brace L, pin $k$, and rubber $i$, substantially as and for the purposes set forth.

6. The perch-iron N, provided with hinged loops O O, in combination with the front and back springs, perch-pole M, bolts $p$, and nuts $o$ made solid in the perch-iron, all as and for the purposes set forth.

7. The combination of the axle-stays P P, secured to the rear axle by the hinged cuffs R R, perch-pole M, bolts $s$, and nuts $r$ made solid in one of the stays, as and for the purposes set forth.

8. The combination, with the bed U and spring-bar V, of the bed-irons T formed with loops $w$, the hinged bars $x$, and bolts $y$ $z$, all substantially as and for the purposes set forth.

In testimony that I claim the foregoing I have hereunto set my hand this 3d day of November, 1874.

T. Y. VAN CLEAVE.

Witnesses:
J. D. COUPLAND,
G. M. JONES.